US012662185B2

(12) United States Patent
Korayem et al.

(10) Patent No.: US 12,662,185 B2
(45) Date of Patent: Jun. 23, 2026

(54) METHODS AND APPARATUS FOR ESTIMATING BANK ANGLE USING STEERING-RACK FORCE

(71) Applicant: GM Global Technology Operations LLC, Detroit, MI (US)

(72) Inventors: Amin Habibnejad Korayem, Markham (CA); Seyedeh Asal Nahidi, North York (CA); SeyedAlireza Kasaiezadeh Mahabadi, Novi, MI (US); Hojjat Izadi, Richmond Hill (CA); Hualin Tan, Novi, MI (US); Ibrahim A. Badiru, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/923,552

(22) Filed: Oct. 22, 2024

(65) Prior Publication Data

US 2026/0109398 A1 Apr. 23, 2026

(51) Int. Cl.
B62D 5/04 (2006.01)
B62D 6/00 (2006.01)

(52) U.S. Cl.
CPC ........... B62D 5/0481 (2013.01); B62D 5/046 (2013.01); B62D 6/00 (2013.01)

(58) Field of Classification Search
CPC ......... B62D 5/0481; B62D 5/046; B62D 6/00
See application file for complete search history.

(56) References Cited

FOREIGN PATENT DOCUMENTS

| | | |
|---|---|---|
| DE | 102006016746 A1 | 10/2006 |
| DE | 102016204018 A1 | 9/2017 |
| EP | 1346856 A2 | 9/2003 |
| JP | 2019072220 A | 5/2019 |
| WO | WO-0220318 A1 * | 3/2002 .......... B60W 40/109 |

* cited by examiner

*Primary Examiner* — Long T Tran
*Assistant Examiner* — Charles J Brauch
(74) *Attorney, Agent, or Firm* — Honigman LLP; Matthew H. Szalach; Jonathan P. O'Brien

(57) ABSTRACT

A computer-implemented method executed by data processing hardware that causes the data processing hardware to perform operations including obtaining a measured position of a steering rack and determining, based on the measured position of the steering rack, an estimate of a lateral force in an axle. The operations also include determining, using an inertial measurement unit, a measurement of the lateral force in the axle. The operations further include determining a difference between the estimate of the lateral force in the axle and the measurement of the lateral force in the axle and determining, based on the difference, an estimate of a bank angle of a surface.

20 Claims, 3 Drawing Sheets

400

Obtain a Position of
a Steering Rack                    402

Determine, Based on Position of
Steering Rack, an Estimate of
Lateral Force                      404

Determining, Using an IMU, a
Measured Lateral Force             406

Determining a Difference Between
the Estimated Lateral Force and
the Measured Lateral Force         408

Determining, Based on the Difference,
an Estimated Bank Angle            410

1

METHODS AND APPARATUS FOR ESTIMATING BANK ANGLE USING STEERING-RACK FORCE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Some methods of bank angle estimation rely on measurements of lateral acceleration measured by an inertial measurement unit (IMU). However, such methods may have inherent limitations due to the coupling between center-of-gravity (CG) lateral dynamics and roll dynamics. In other words, usually measured lateral accelerations can only be utilized to estimate bank angle when lateral velocity has a reached a steady state condition and roll motion is negligible.

The present disclosure relates generally to estimating a bank angle using a steering-rack force.

SUMMARY

One aspect of the disclosure provides a vehicle including a steering rack, an axle, an inertial measurement unit (IMU), data processing hardware, and memory hardware. The memory hardware is in communication with the data processing hardware and stores instructions that, when executed by the data processing hardware, cause the data processing hardware to perform operations. The operations include obtaining a measured position of the steering rack, and determining, based on the measured position of the steering rack, an estimate of a lateral force in the axle. The operations also include determining, using the IMU, a measurement of the lateral force in the axle, and determining a difference between the estimate of the lateral force in the axle and the measurement of the lateral force in the axle. The operations further include determining, based on the difference, an estimate of a bank angle of a surface on which the vehicle is situated.

Implementations of the disclosure may include one or more of the following optional features. In some implementations, determining, based on the measured position of the steering rack, the estimate of the lateral force in the axle includes determining, based on the measured position of the steering rack, an estimate of a steering-rack force load, and determining, based on the estimate of the steering-rack force load, the estimate of the lateral force in the axle. In some examples, determining the estimate of the lateral force in the axle is based on a mathematical steering compliance model representing a first relationship between a steering-rack force and a lateral acceleration. The mathematical steering compliance model may also represent a second relationship between a traction force and a lateral acceleration, and a third relationship between a normal force and a lateral acceleration.

In some examples, the vehicle also includes a motor configured to operate the steering rack, and determining, based on the measured position of the steering rack, the estimate of the lateral force in the axle includes obtaining a measurement of a motor current of the motor, determining, based on the measurement of the motor current, an estimate of a steering-rack force load, and determining, based on the estimate of the steering-rack force load, the estimate of the lateral force in the axle. In some implementations, determining, using the IMU, the measurement of the lateral force in the axle includes obtaining, using the IMU, a lateral acceleration, and determining, based on the lateral acceleration, the measurement of the lateral force in the axle.

In some implementations, the operations also include obtaining a measurement of an environmental condition, determining that the measurement of the environmental condition satisfies a criterion, and, based on determining that the measurement of the environmental condition satisfies the criterion, adjusting the estimate of the bank angle. In some examples, determining that the measurement of the environmental condition satisfies a criterion includes determining that a windy condition is present, and adjusting the estimate of the bank angle includes discarding the estimate of the bank angle.

Another aspect of the disclosure provides a system that includes data processing hardware and memory hardware in communication with the data processing hardware. The memory hardware stores instructions that, when executed on the data processing hardware, cause the date processing hardware to perform operations. The operations include obtaining a measured position of a steering rack, and determining, based on the measured position of the steering rack, an estimate of a lateral force in an axle. The operations also include determining, using an inertial measurement unit (IMU), a measurement of the lateral force in the axle, and determining a difference between the estimate of the lateral force in the axle and the measurement of the lateral force in the axle. The operations further include determining, based on the difference, an estimate of a bank angle of a surface.

Implementations of the disclosure may include one or more of the following optional features. In some implementations, determining, based on the measured position of the steering rack, the estimate of the lateral force in the axle includes determining, based on the measured position of the steering rack, an estimate of a steering-rack force load, and determining, based on the estimate of the steering-rack force load, the estimate of the lateral force in the axle. In some examples, determining the estimate of the lateral force in the axle is based on a mathematical steering compliance model representing a first relationship between a steering-rack force and a lateral acceleration. The mathematical steering compliance model may also represent a second relationship between a traction force and a lateral acceleration, and a third relationship between a normal force and a lateral acceleration.

In some examples, determining, based on the measured position of the steering rack, the estimate of the lateral force in the axle includes obtaining a measurement of a motor current of a motor configured to operate the steering rack, determining, based on the measurement of the motor current, an estimate of a steering-rack force load, and determining, based on the estimate of the steering-rack force load, the estimate of the lateral force in the axle. In some implementations, determining, using the IMU, the measurement of the lateral force in the axle includes obtaining, using the IMU, a lateral acceleration, and determining, based on the lateral acceleration, the measurement of the lateral force in the axle.

In some implementations, the operations also include obtaining a measurement of an environmental condition, determining that the measurement of the environmental condition satisfies a criterion, and, based on determining that the measurement of the environmental condition satisfies the criterion, adjusting the estimate of the bank angle. In some examples, determining that the measurement of the environmental condition satisfies a criterion includes determining that a windy condition is present, and adjusting the estimate of the bank angle includes discarding the estimate of the bank angle.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
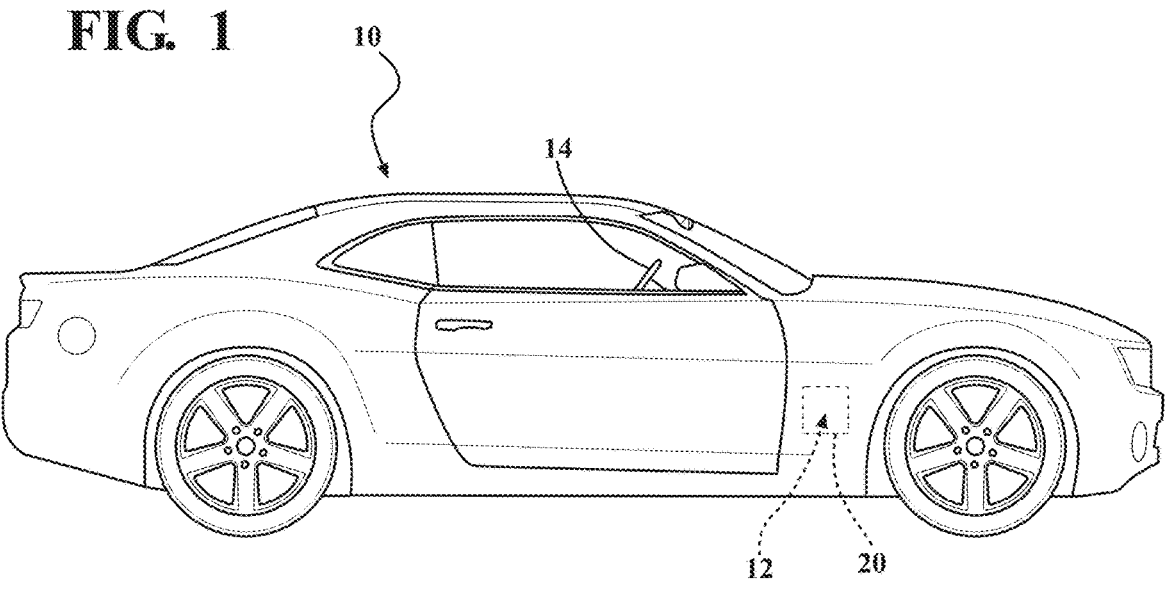
FIG. 1 is a view of an example vehicle incorporating a bank-angle estimation system in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Unless expressly stated to the contrary, the phrase "at least one of A, B, or C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least C; and (7) at least one A with at least one B and at least one C. Moreover, unless expressly stated to the contrary, the phrase "at least one of A, B, and C" is intended to refer to any combination or subset of A, B, C such as: (1) at least one A alone; (2) at least one B alone; (3) at least one C alone; (4) at least one A with at least one B; (5) at least one A with at least one C; (6) at least one B with at least one C; and (7) at least one A with at least one B and at least one C. Furthermore, unless expressly stated to the contrary, "A or B" is intended to refer to any combination of A and B, such as: (1) A alone; (2) B alone; and (3) A and B.

Some methods of bank angle estimation rely on measurements of lateral acceleration measured by an inertial measurement unit (IMU). However, such methods may have inherent limitations due to the coupling between center-of-gravity (CG) lateral dynamics and roll dynamics. In other words, usually measured lateral accelerations can only be utilized to estimate bank angle when lateral velocity has a reached steady state condition and roll motion is negligible. Bank angle may be crucial information that needs to be considered in, for example, electronic stability control (ESC), roll stability control (RSC), automatic stability control (ASC), and/or advanced driver assistance system (ADAS) modules. Therefore, there is a need for improved methods and systems for estimating bank angle.

Disclosed configurations estimate bank angles based on estimated steering-rack forces, which can be used together with measured steering-rack forces, to distinguish between multiple causations of center-of-gravity (CG) lateral dynamics changes such as steering and pedal inputs (and consequent lateral velocity and acceleration), roll dynamics (consequent additional lateral force due to roll dynamics and CG mass), and bank angle (consequent additional lateral force due to road gradient and CG mass). In particular, disclosed configurations utilize a real-time estimate of steering-rack force, or tie-rod load, that is estimated using information obtain from a steering module or a steering rack. The real-time estimate of steering-rack force, or tie-rod load, may then be used to estimate lateral force using a mathematical compliance model. Notably, the estimated steering-rack force and the estimated lateral force do not get influenced by the lateral acceleration due to road bank angle and, thus, a difference between the estimated lateral force and a lateral force measured by an IMU is an indication of bank angle and its effects on CG dynamics. Here, the lateral force in an axle may be used to estimate lateral acceleration considering yaw acceleration, steering angle, and inertial and geometrical properties of a vehicle. The estimated lateral acceleration may be compared with a lateral acceleration measured by an IMU, and the difference between the estimated and measured lateral accelerations may be used to estimate bank angle.

Disclosed configurations are immune to couplings between vehicle dynamic motions, such as roll, pitch, and lateral dynamics. Severe driving scenarios or external environmental factors such as road condition, crosswind, and variations in terrain may result in unintended roll, pitch, and lateral skid, making bank angle estimation challenging. Accordingly, disclosed configurations utilize sensory information/estimation based on rack force to estimate lateral force in the front axle and map that to lateral acceleration. Based on comparison logic, disclosed configurations estimate lateral acceleration without dependencies on road gradients, thereby distinguishing between lateral force/acceleration created due to driver steering and pedal inputs, and/or roll and pitch motions, crosswind, and/or road gradient (bank angle).

While configurations are shown and described herein in connection with a vehicle (e.g., an automobile, a truck, an airplane, a train, a motorcycle, a drone, etc.), it should be understood that disclosed configurations may, additionally or alternatively, be used for estimating bank angle for any other type of device (e.g., a robot, a bicycle, equipment, etc.). Here, a vehicle or device may be operated by a person or may operate independently.

Figure 2:
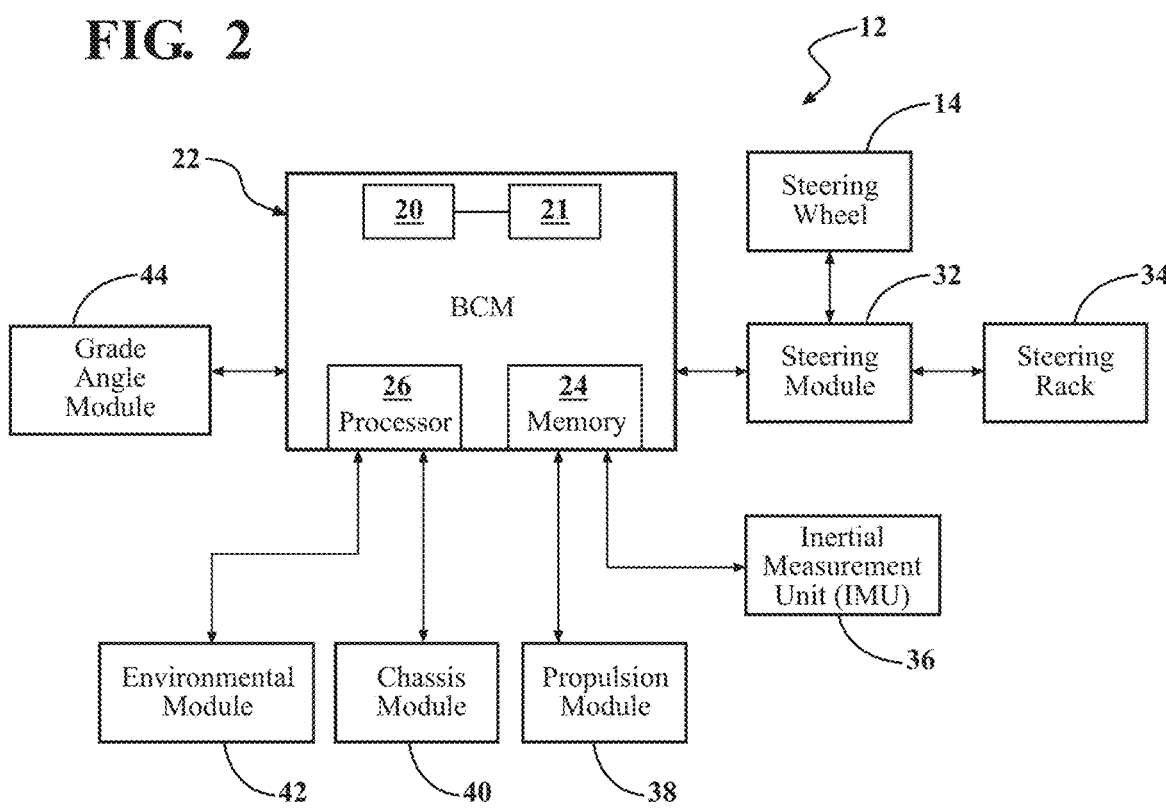
FIG. 2 is a schematic view of the bank-angle estimation system of FIG. 1.

With particular reference to FIGS. 1 and 2, a vehicle 10 (e.g., an automobile, a truck, an airplane, a train, a motorcycle, a drone, etc.) is shown in conjunction with a bank-angle estimation system 12. As will be described in greater detail below, the bank-angle estimation system 12 may be used to estimate a bank angle $\psi$ of a surface on which the vehicle 10 is situated or moving.

The bank-angle estimation system 12 includes a bank-angle estimation module 20 that may be stored and executed by a body control module (BCM) 22 or another control module of the vehicle 10. Specifically, the BCM 22 may store machine-readable instructions for executing the operations shown in FIG. 3 and/or FIG. 4, for example, on memory hardware 24, which may be executed by data processing hardware (e.g., a processor 26) of the BCM 22 or another control module to perform the operations. In the illustrated example, the bank-angle estimation module 20 is in communication with a steering module 32 that receives steering user inputs from a steering wheel 14 of the vehicle 10 and controls, based on steering user inputs, a steering rack 34 of the vehicle 10 to steer the vehicle 10 according to the steering user inputs. The steering module 32 provides measurements of steering rack position of the steering rack 34 to the bank-angle estimation module 20.

In the illustrated example, the bank-angle estimation module 20 is in communication with, and provides estimated bank angles $\psi$ to, a grade angle module 44. The grade angle module 44 may, for example, use estimated bank angles $\psi$ for performing, for example, ESC, RSC, ASC, and/or ADAS functions.

The bank-angle estimation module 20 is also in communication with an inertial measurement unit (IMU) 36, a propulsion module 38, a chassis module 40, and an environmental module 42. The IMU 36 provides measurements of lateral acceleration $a_{y\_IMU}$ and roll rate $\dot{y}$ to the bank-angle estimation module 20. The propulsion module 38 provides measurements of propulsion torque $\tau$ to the bank-angle estimation module 20. The chassis module 40 provides measurements of longitudinal velocity $v_x$ (i.e., speed) to the bank-angle estimation module 20. The environment module 42 provides measurements of environmental conditions, such as wind speed, to the bank-angle estimation module 20.

The bank-angle estimation module 20 obtains, from the steering module 32, a measurement of a position of the steering rack 34. The bank-angle estimation module 20 determines, based on the measured position of the steering rack, a first estimate of a lateral force in the axle. The bank-angle estimation module 20 also determines, using the IMU 36, a measurement of the lateral force in the axle. The bank-angle estimation module 20 then determines a difference between the estimate of the lateral force in the axle and the measurement of the lateral force in the axle, and determines, based on the difference, a bank angle $\psi$ of a surface on which the vehicle 10 is situated or moving. In some examples, the bank-angle estimation module 20 estimates the lateral force and bank angle $\psi$ using the following mathematical expressions:

1. The bank-angle estimation module 20 may estimate the lateral force in an axle by computing:

$$T_{x_{total}} = F_{x_{total}}\cos(\tau)[r_{kp}\cos(\gamma) + R_{nom}\sin(\gamma)]$$

$$F_{x_{total}} = (F_{tire_x} - F_{rolling})\cos(\delta_w) - F_{tire_y}\sin(\delta_w)$$

$$F_{rolling} = -f_r g\min(1, v_x)\text{sign}(v_x)$$

$$T_{y_{total}} = F_{y_{total}}\cos(\gamma)[t\cos(\tau) + R_{nom}\sin(\tau)]$$

$$F_{y_{total}} = F_{tire_y}\cos(\delta_w) + (F_{tire_x} - F_{rolling})\sin(\delta_w)$$

$$T_{x_{total}} = F_{x_{total}}\sin(\gamma)\cos(\tau)\sin(\delta_w)[\cos(\tau)(r_{kp} + R_{nom}\sin(\tau))]$$

$$F_{z_{total}} = \frac{N_{fx}}{2} + \frac{Z_g N_{fx} a_y}{L_f g}$$

$$N_{fx} = \frac{mgX_r}{X_r + X_f} - \frac{ma_x Z_g}{X_r + X_f}$$

2. The bank-angle estimation module 20 may estimate total force transmitted by steering rack to tire using a mathematical steering compliance model 21 representing a relationship between a traction force and a lateral acceleration and a relationship between a normal force and a lateral acceleration, by computing:

$$F_{ySbW} = \left(\frac{LF_r - F_{xtotal}\cos(\tau)[r_{kp}\cos(\gamma) + R_{nom}\sin(\gamma)] - T_{z_{total}}}{\cos(\gamma)[t\cos(\tau) + R_{nom}\sin(\tau)]}\right)$$

$$x[k+1] = x[k] + \Delta t(kx[k] - x_{des}[k])$$

$$x[k+1] = Ax[k] + BU[k]$$

$$A = [1 + \Delta tk], B = I_{1+1}$$

$$F_{ySbW}[k] = x[k]$$

-continued $$u[k] = \left( \frac{LF_r - F_{xtotal}\cos(\tau)[r_{kp}\cos(\gamma) + R_{nom}\sin(\gamma)] = T_{z_{total}}}{\cos(\gamma)[t\cos(\tau) + R_{nom}\sin(\tau)]} \right)$$

$$\underbrace{M(\ddot{y} + \dot{r}v_x)}_{a_{y\_IMU}} = F_{yf-Cl}\cos(\delta_f) - F_{yr-Cl}\cos(\delta_r)$$

$$I_z\dot{r} = T_M + L_1 F_{yf-Cl}\cos(\delta_f) - L_2 F_{yr-Cl}\cos(\delta_r)$$

$$F_{yf-Cl} = \frac{I_z\dot{r} - T_M + L_2 a_y}{(L_1 + L_2)\cos(\delta_f)}$$

$$F_{yr-Cl} = \frac{Ma_y - F_{yf-Cl}\cos(\delta_f)}{\cos(\delta_r)}$$

Here, the rear axle lateral force $f_{yr-Cl}$ is calculated based on the estimated front axle lateral force $f_{yf-Cl}$ following the vehicle dynamics to remove or reduce a bank angle effect on the estimated lateral force for the rear axle of the vehicle 10.

3. The bank-angle estimation module 20 may estimate bank angle $\psi$ by computing:

$$F_{yf-SBWR} = f(\theta_m, \dot{\theta}_m)$$

$$I_z\dot{r} = T_M + L_1 F_{yf-SBWR}\cos(\delta_f) - L_2 F_{yr-SBWR}\cos(\delta_r) + I_{xz}\ddot{y}$$

$$F_{yr-SBWR} = \frac{TM + L_1 F_{yf-SBWR}\cos(\delta_f) - I_z\dot{r} + I_{xz}\ddot{y}}{L_2\cos(\delta_r)}$$

$$M\underbrace{(\ddot{y} + \dot{r}v_x - gh_\theta\ddot{y} - g\cos(\theta)\sin(\psi))}_{a_{y-SBWR}} = F_{yf-SBWR}\cos(\delta_f) + F_{yr-SBWR}\cos(\delta_r)$$

$$a_{y-SBWR} = \frac{F_{yf-SBWR}\cos(\delta_f) + F_{yr-SBWR}\cos(\delta_r)}{M}$$

$$\psi = \arcsin\left( \frac{a_{r-SBWR} - a_{y-IMU} - gh_\theta\ddot{y}}{g\cos(\theta)} \right) - \gamma$$

Here, a lateral force determined using lateral acceleration and IMU measurements is compared with a lateral force estimated using rack force estimation that does not contain lateral acceleration due to road bank angle. The discrepancy between estimated lateral force and the determined lateral force is an indication of bank angle and its effect on CG dynamics.

The variables above are defined as:

| Variable Name | Description |
|---|---|
| $T_{x_{total}}$ | The total resistant torque generated around the steering x axis |
| $T_{yx_{total}}$ | The total resistant torque generated around the steering y axis |
| $T_{z_{total}}$ | The total resistant torque generated around the steering z axis |
| $F_{x_{total}}$ | The total resistant force generated around the steering x axis |
| $F_{yx_{total}}$ | The total resistant force generated around the steering y axis |
| $F_{z_{total}}$ | The total resistant force generated around the steering z axis |
| $R_{nom}$ | Nominal tire radius |
| $f_r$ | Friction force |
| $N_{fx}$ | Nominal tire force |
| $L_f$ | Front axle track width |
| $g$ | Gravity coefficient |
| $F_{rack}$ | The resistant force acting on the rack |
| $T_{total}$ | The total resistant torque generated around the steering axis |
| $F_{tire_x}$ | Tire force in the longitudinal direction |
| $F_{tire_y}$ | Tire force in the lateral direction |
| $F_{tire_z}$ | Tire force in the normal direction |
| $F_{rolling}$ | Force generated by rolling resistance |

-continued

| Variable Name | Description |
|---|---|
| $F_{ySBW}$ | The total resistant force generated around the steering y axis in SBW system |
| $F_{ySBW}$ | The total resistant force generated around the steering y axis in SBW system |
| L | Front axle track width |
| $F_r$ | The resistant force acting on the rack |
| x | State space |
| $x_d$ | Desired states |
| A | System matrix |
| B | Input matrix |
| U | System Input |
| K | Time step |
| I | Identity matrix |
| $\delta_w$ | Road wheel angle |
| $v_x$ | Vehicle forward speed |
| y | Vehicle lateral movement |
| $F_{yf-cl}$ | Front lateral tire force in classic approach |
| $F_{yr-cl}$ | Rear lateral tire force in classic approach |
| $T_M$ | Traction force |
| $L_1$ | Front axle length |
| $L_2$ | Rear axle length |
| $I_z$ | Vehicle moment of inertia in z direction |
| $\theta_m$ | Pinion angle measured |
| $I_{xx}$ | Vehicle moment of inertia in x direction |
| $h_\theta$ | Vehicle rolling height |
| $F_{yf-TFOR}$ | Front lateral tire force in classic approach (TFOR) |
| $a_x$ | Vehicle longitudinal acceleration |
| $a_{y\_IMU}$ | Vehicle lateral acceleration measured by IMU |
| $a_{y\_SBW}$ | Vehicle lateral acceleration estimated in SBW module |
| M | Vehicle curb mass |
| $X_r$ | Longitudinal distance between mass center and rear axle |
| $X_f$ | Longitudinal distance between mass center and front axle |
| $Z_g$ | The height of mass center with respect to the ground |
| L | The length of steering arm |
| $\tau$ | Castle angle |
| $\gamma$ | Kingpin angle |
| $r_{kp}$ | Kingpin radius |
| $R_{nom.}$ | Tire nominal radius |
| t | Static Offset |
| $\tau$ | Castle angle |
| $\tau$ | Castle angle |
| $L_f$ | Axle length |

Figure 3:
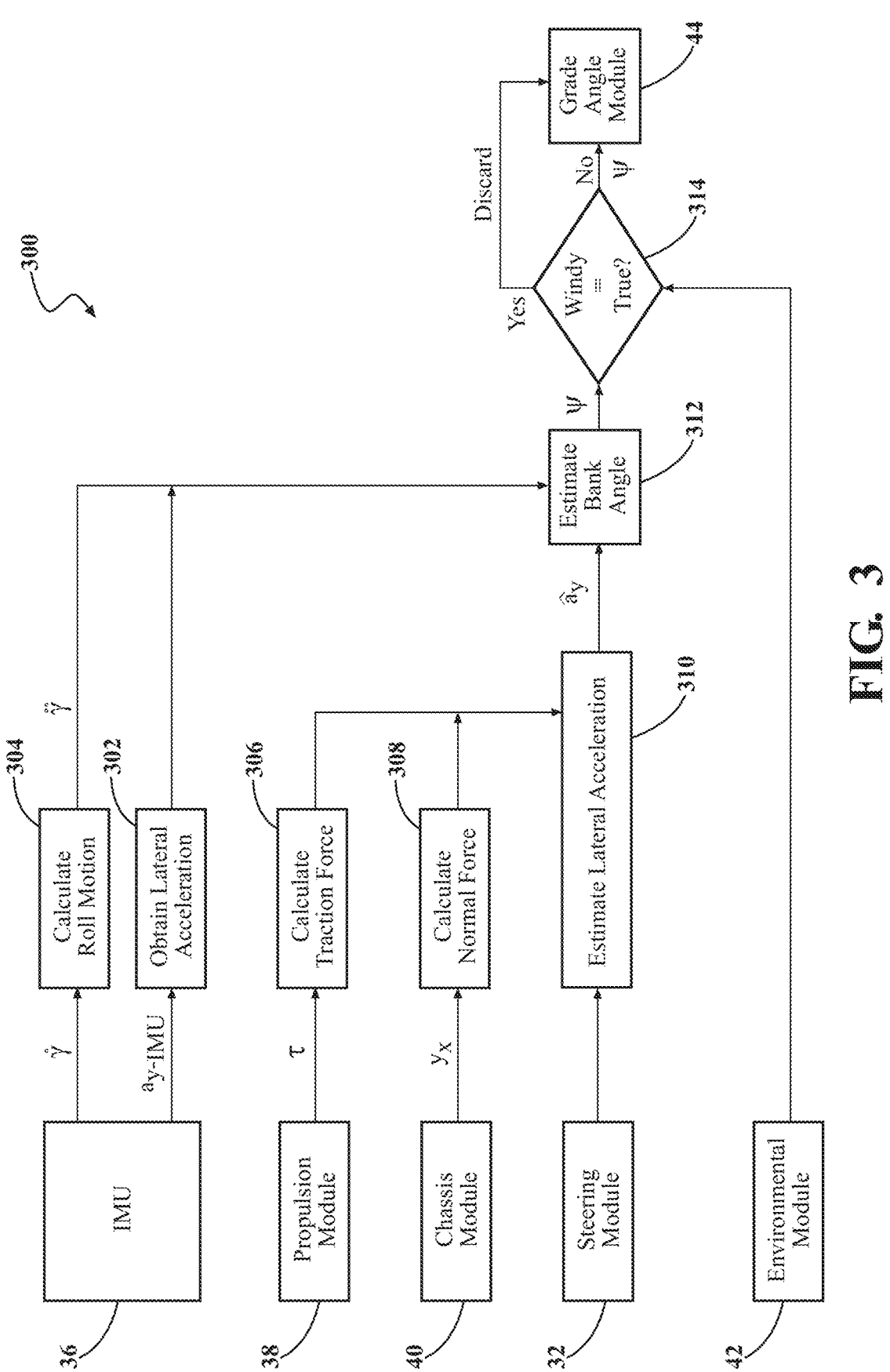
FIG. 3 is a flow chart of an example arrangement of operations for a method of estimating a bank angle.

FIG. 3 is a flowchart of an exemplary arrangement of operations for a computer-implemented method 300 of estimating a bank angle. The operations may be performed by data processing hardware (e.g., the processor 26 of FIG. 1) based on executing instructions stored on memory hardware (e.g., the memory 24 of FIG. 1).

At operation 302, the method 300 includes obtaining a measured lateral acceleration $a_{y\_IMU}$ measured by the IMU 36. At operation 304, the method 300 includes obtaining a measured roll rate $\dot{y}$ measured by the IMU 36 and determining a roll acceleration $\ddot{y}$ and a roll angle $h_\theta$.

At operation 306, the method 300 includes obtaining a torque $\tau$ from the propulsion module 38 and determining a traction force $T_M$ based on the torque $\tau$ (see above). At operation 308, the method 300 includes obtaining a velocity $v_x$ from the chassis module 40 and determining a normal force based on the velocity $v_x$ (see above).

At operation 310, the method 300 includes determining a steering-rack force $F_r$ based on a position of the steering rack 34 and estimating a lateral acceleration $\hat{a}_y$ based on the steering-rack force $F_r$ (see above). At operation 312, the method 300 includes estimating the bank angle $\psi$ using vehicle inertial properties, the measured lateral acceleration $a_{y\_IMU}$, and the estimated lateral acceleration $\hat{a}_y$ (see above).

At operation 314, the method 300 includes obtaining a measurement of an environmental condition, determining whether the measurement of the environmental condition satisfies a criterion and, based on determining that the measurement of the environmental condition satisfies the criterion, adjusting the determined bank angle ψ. In some examples, the environmental condition satisfies a criterion when a windy condition is present, and adjusting the determined bank angle includes discarding the determined bank angle ψ.

Figure 4:
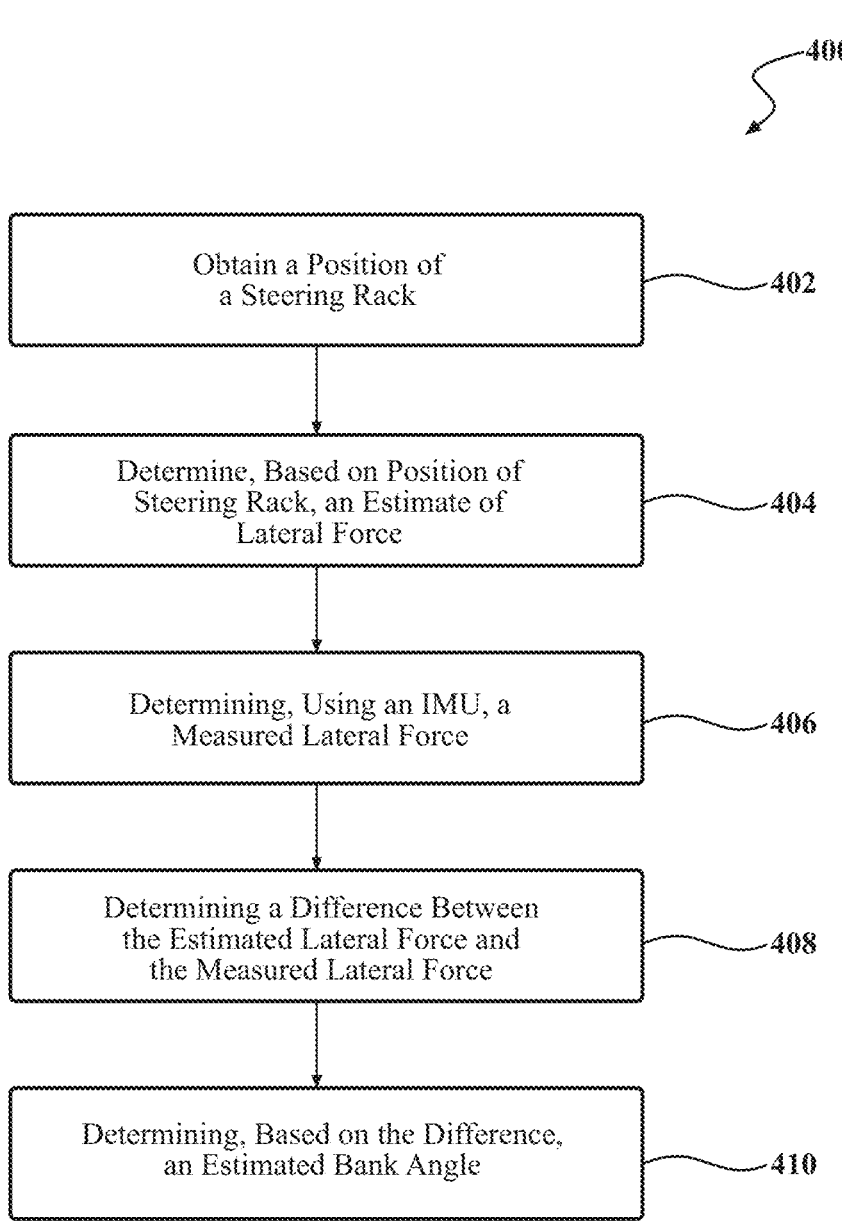
FIG. 4 is a flow chart of another example arrangement of operations for a method of estimating a bank angle.

FIG. 4 is a flowchart of an exemplary arrangement of operations for a computer-implemented method 400 of estimating a bank angle. The operations may be performed by data processing hardware (e.g., the processor 26 of FIG. 1) based on executing instructions stored on memory hardware (e.g., the memory 24 of FIG. 1).

At operation 402, the method 400 includes obtaining a measured position of a steering rack 34 of a vehicle 10. At operation 404, the method 400 includes determining, based on the measured position of the steering rack 34, an estimate of a lateral force in an axle of the vehicle 10. At operation 406, the method 400 includes determining, using an IMU 36 of the vehicle 10, a measurement of the lateral force in the axle.

At operation 408, the method 400 includes determining a difference between the estimate of the lateral force in the axle and the measurement of the lateral force in the axle. At operation 410, the method 400 includes determining, based on the difference, an estimate of a bank angle ψ of a surface on which the vehicle 10 is situated.

In some implementations, determining, based on the measured position of the steering rack 34, the estimate of the lateral force in the axle includes determining, based on the measured position of the steering rack 34, an estimate of a steering-rack force load and determining, based on the estimate of the steering-rack force load, the estimate of the lateral force in the axle. In some examples, determining the estimate of the lateral force in the axle is based on a mathematical steering compliance model 21 representing a first relationship between a steering-rack force and a lateral acceleration. The mathematical steering compliance model may also represent a second relationship between a traction force and a lateral acceleration, and a third relationship between a normal force and a lateral acceleration.

In some examples, the vehicle also includes a motor configured to operate the steering rack 34 and determining, based on the measured position of the steering rack 34, the estimate of the lateral force in the axle includes obtaining a measurement of a motor current of the motor, determining, based on the measured of the motor current, an estimate of a steering-rack force load, and determining, based on the estimate of the steering-rack force load, the estimate of the lateral force in the axle.

In some implementations, determining, using the IMU 36, the measurement of the lateral force in the axle includes obtaining, using the IMU 36, a lateral acceleration and determining, based on the lateral acceleration, the measurement of the lateral force in the axle.

In some examples, the operations also include obtaining a measurement of an environmental condition, determining that the measurement of the environmental condition satisfies a criterion, and, based on determining that the measurement of the environmental condition satisfies the criterion, adjusting the estimate of the bank angle. Determining that the measurement of the environmental condition satisfies a criterion may include determining that a windy condition is present. Adjusting the estimate of the bank angle may include discarding the estimate of the bank angle.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle comprising:
a steering rack;
an axle;
an inertial measurement unit (IMU);
data processing hardware; and
memory hardware in communication with the data processing hardware and storing instructions that, when executed by the data processing hardware, cause the data processing hardware to perform operations comprising:
obtaining a measured position of the steering rack;
determining, based on the measured position of the steering rack, an estimate of a lateral force in the axle;
determining, using the IMU, a measurement of the lateral force in the axle;
determining a difference between the estimate of the lateral force in the axle and the measurement of the lateral force in the axle; and
determining, based on the difference, an estimate of a bank angle of a surface on which the vehicle is situated.

2. The vehicle of claim 1, wherein determining, based on the measured position of the steering rack, the estimate of the lateral force in the axle comprises:
determining, based on the measured position of the steering rack, an estimate of a steering-rack force load; and
determining, based on the estimate of the steering-rack force load, the estimate of the lateral force in the axle.

3. The vehicle of claim 1, wherein determining the estimate of the lateral force in the axle is based on a mathematical steering compliance model representing a first relationship between a steering-rack force and a lateral acceleration.

4. The vehicle of claim 3, wherein the mathematical steering compliance model also represents a second relationship between a traction force and a lateral acceleration, and a third relationship between a normal force and a lateral acceleration.

5. The vehicle of claim 1, wherein:
the vehicle further comprises a motor configured to operate the steering rack; and
determining, based on the measured position of the steering rack, the estimate of the lateral force in the axle comprises:
obtaining a measurement of a motor current of the motor;
determining, based on the measurement of the motor current, an estimate of a steering-rack force load; and
determining, based on the estimate of the steering-rack force load, the estimate of the lateral force in the axle.

6. The vehicle of claim 1, wherein determining, using the IMU, the measurement of the lateral force in the axle comprises:

obtaining, using the IMU, a lateral acceleration; and determining, based on the lateral acceleration, the measurement of the lateral force in the axle.

7. The vehicle of claim 1, wherein the operations further comprise:

obtaining a measurement of an environmental condition;

determining that the measurement of the environmental condition satisfies a criterion; and based on determining that the measurement of the environmental condition satisfies the criterion, adjusting the estimate of the bank angle.

8. The vehicle of claim 7, wherein:

determining that the measurement of the environmental condition satisfies a criterion comprises determining that a windy condition is present; and adjusting the estimate of the bank angle comprises discarding the estimate of the bank angle.

9. A computer-implemented method executed by data processing hardware that causes the data processing hardware to perform operations comprising:

obtaining a measured position of a steering rack;

determining, based on the measured position of the steering rack, an estimate of a lateral force in an axle;

determining, using an inertial measurement unit (IMU), a measurement of the lateral force in the axle;

determining a difference between the estimate of the lateral force in the axle and the measurement of the lateral force in the axle; and determining, based on the difference, an estimate of a bank angle of a surface.

10. The computer-implemented method of claim 9, wherein determining, based on the measured position of the steering rack, the estimate of the lateral force in the axle comprises:

determining, based on the measured position of the steering rack, an estimate of a steering-rack force load; and determining, based on the estimate of the steering-rack force load, the estimate of the lateral force in the axle.

11. The computer-implemented method of claim 9, wherein determining the estimate of the lateral force in the axle is based on a mathematical steering compliance model representing a first relationship between a steering-rack force and a lateral acceleration.

12. The computer-implemented method of claim 11, wherein the mathematical steering compliance model also represents a second relationship between a traction force and a lateral acceleration, and a third relationship between a normal force and a lateral acceleration.

13. The computer-implemented method of claim 9, wherein determining, based on the measured position of the steering rack, the estimate of the lateral force in the axle comprises:

obtaining a measurement of a motor current of a motor configured to operate the steering rack;

determining, based on the measurement of the motor current, an estimate of a steering-rack force load; and determining, based on the estimate of the steering-rack force load, the estimate of the lateral force in the axle.

14. The computer-implemented method of claim 9, wherein determining, using the IMU, the measurement of the lateral force in the axle comprises:

obtaining, using the IMU, a lateral acceleration; and determining, based on the lateral acceleration, the measurement of the lateral force in the axle.

15. The computer-implemented method of claim 9, wherein the operations further comprise:

obtaining a measurement of an environmental condition;

determining that the measurement of the environmental condition satisfies a criterion; and based on determining that the measurement of the environmental condition satisfies the criterion, adjusting the estimate of the bank angle.

16. The computer-implemented method of claim 15, wherein:

determining that the measurement of the environmental condition satisfies a criterion comprises determining that a windy condition is present; and adjusting the estimate of the bank angle comprises discarding the estimate of the bank angle.

17. A vehicle comprising:

a steering rack;

a motor configured to operate the steering rack; an axle;

an inertial measurement unit (IMU);

data processing hardware; and memory hardware in communication with the data processing hardware and storing instructions that, when executed by the data processing hardware, cause the data processing hardware to perform operations comprising:

obtaining a measured position of the steering rack;

obtaining a measurement of a motor current of the motor;

determining, based on the measured position of the steering rack and the measurement of the motor current, an estimate of a steering-rack force load; and determining, based on the estimate of the steering-rack force load, an estimate of a lateral force in the axle;

obtaining, using the IMU, a lateral acceleration;

determining, based on the lateral acceleration, a measurement of a lateral force in the axle;

determining a difference between the estimate of the lateral force in the axle and the measurement of the lateral force in the axle; and determining, based on the difference, an estimate of a bank angle of a surface on which the vehicle is situated.

18. The vehicle of claim 17, wherein determining the estimate of the lateral force in the axle is based on a mathematical steering compliance model representing a first relationship between a steering-rack force and a lateral acceleration.

19. The vehicle of claim 17, wherein the operations further comprise:

obtaining a measurement of an environmental condition;

determining that the measurement of the environmental condition satisfies a criterion; and based on determining that the measurement of the environmental condition satisfies the criterion, adjusting the estimate of the bank angle.

20. The vehicle of claim 19, wherein:

determining that the measurement of the environmental condition satisfies a criterion comprises determining that a windy condition is present; and adjusting the estimate of the bank angle comprises discarding the estimate of the bank angle.

* * * * *